US012723220B2

(12) United States Patent
Mendori et al.

(10) Patent No.: US 12,723,220 B2
(45) Date of Patent: Sep. 1, 2026

(54) CLEANING OR HYDROPHILIZING AGENT COMPOSITION

(71) Applicant: Kao Corporation, Tokyo (JP)

(72) Inventors: Akari Mendori, Tokyo (JP); Takanori Saito, Tokyo (JP); Ayako Okamura, Wakayama (JP)

(73) Assignee: KAO CORPORATION, Tokyo (JP)

( * ) Notice: Subject to any disclaimer, the term of this patent is extended or adjusted under 35 U.S.C. 154(b) by 994 days.

(21) Appl. No.: 17/766,566

(22) PCT Filed: Nov. 17, 2020

(86) PCT No.: PCT/JP2020/042754
§ 371 (c)(1),
(2) Date: May 22, 2023

(87) PCT Pub. No.: WO2021/100692
PCT Pub. Date: May 27, 2021

(65) Prior Publication Data

US 2023/0287301 A1 Sep. 14, 2023

(30) Foreign Application Priority Data

Nov. 21, 2019 (JP) ................................ 2019-210103

(51) Int. Cl.

| | |
|---|---|
| ***C11D 1/28*** | (2006.01) |
| ***C11D 1/02*** | (2006.01) |
| ***C11D 1/12*** | (2006.01) |
| ***C11D 1/72*** | (2006.01) |
| ***C11D 1/83*** | (2006.01) |
| *C11D 1/14* | (2006.01) |
| *C11D 1/22* | (2006.01) |
| *C11D 1/722* | (2006.01) |

(52) U.S. Cl.
CPC ............. *C11D 1/8305* (2013.01); *C11D 1/02* (2013.01); *C11D 1/12* (2013.01); *C11D 1/28* (2013.01); *C11D 1/143* (2013.01); *C11D 1/22* (2013.01); *C11D 1/72* (2013.01); *C11D 1/721* (2013.01); *C11D 1/722* (2013.01); *C11D 2111/18* (2024.01); *C11D 2111/42* (2024.01)

(58) Field of Classification Search
CPC .... C11D 1/02; C11D 1/12; C11D 1/28; C11D 1/72; C11D 1/722
USPC ................................ 510/238, 424, 427, 429
See application file for complete search history.

(56) References Cited

U.S. PATENT DOCUMENTS

| | | | |
|---|---|---|---|
| 5,078,916 A | 1/1992 | Kok et al. | |
| 5,385,681 A | 1/1995 | Sato et al. | |
| 6,342,473 B1 | 1/2002 | Kott et al. | |
| 9,493,726 B2 * | 11/2016 | Vinson | C11D 3/38636 |
| 2016/0304767 A1 * | 10/2016 | Barnes | C09K 8/584 |
| 2017/0369817 A1 | 12/2017 | Deleersnyder | |
| 2019/0169536 A1 | 6/2019 | Tabuchi et al. | |

FOREIGN PATENT DOCUMENTS

| | | | |
|---|---|---|---|
| GB | 2236538 | A | 4/1991 |
| JP | H03-126793 | A | 5/1991 |
| JP | H6-200471 | A | 7/1994 |
| JP | H08-53696 | A | 2/1996 |
| JP | 2016035009 | A | 3/2016 |
| JP | 2016147927 | A | 8/2016 |
| JP | 2016147928 | A | 8/2016 |
| JP | 2018039881 | A | 3/2018 |
| WO | WO-2018030328 | A1 | 2/2018 |

OTHER PUBLICATIONS

Combined Taiwanese Office Action and Search Report issued Apr. 26, 2024 in corresponding Taiwanese Patent Application 22999 No. 109140079, 8 pages.
English translation of the International Preliminary Report on Patentability issued Jun. 2, 2022 in PCT/JP2020/042754, 6 pages.
H. Kunieda et al, "The Three-Phase Behavior of a Brine/Ionic Surfactant/Nonionic Surfactant/Oil System: Evaluation of the Hydrophile-Lipophile Balance (HLB) of Ionic Surfactant", Journal of Colloid and Interface Science, vol. 107, No.1, Sep. 1985 pp. 129-137.
Hironobu Kuneida et al, "Evaluation of Hydrophile-Lipophile Balance (HLB) of Nonionic Surfactants", Journal of Colloid and Interface Science, vol. 107. No. 1, Sep. 1985, pp. 107-121.
Hironobu Kuneida et al, "Evaluation of Hydrophile-Lipophile Balance (HLB) of Nonionic Surfactants", Journal of Colloid and Interface Science, vol. 107. No. 1, Sep. 1985, pp. 122-128.
International Search Report issued Jan. 26, 2021 in PCT/JP2020/042754 (with English translation), 5 pages.
J. Stapersma et al, "Hydroxy Alkane Sulfonate (HAS), a New Surfactant Based on Olefins", Journal of American Oil Chemists' Society, vol. 69, No. 1, Jan. 1992, pp. 39-43.
Extended European Search Report issued Dec. 1, 2023 in European Patent Application No. 20889550.8, 9 pages.

* cited by examiner

*Primary Examiner* — Gregory R Delcotto
(74) *Attorney, Agent, or Firm* — Element IP, PLC

(57) ABSTRACT

Provided are a cleaning or hydrophilizing agent composition and a method for cleaning or hydrophilizing a hard surface excellent in cleaning power and capable of imparting hydrophilicity to hard surfaces. The cleaning or hydrophilizing agent composition contains (A) an anionic surfactant (hereinafter referred to as component (A)), (B) a nonionic surfactant (hereinafter referred to as component (B)) and water, wherein the composition contains
(A1) a branched anionic surfactant as component (A), and
(B1) a nonionic surfactant having a hydrocarbon group with 8 or more and 22 or less carbons as component (B).

17 Claims, No Drawings

CLEANING OR HYDROPHILIZING AGENT COMPOSITION

FIELD OF THE INVENTION

The present invention relates to a cleaning or hydrophilizing agent composition and a method for cleaning or hydrophilizing a hard surface.

BACKGROUND OF THE INVENTION

Anionic surfactants are excellent in cleaning power and foamability and widely used as components of cleaning agents. As one of the anionic surfactants, internal olefin sulfonate salts obtained from raw material internal olefins having double bonds inside olefin chains rather than at the ends thereof are known. Internal olefin sulfonate salts are obtained, for example, by reacting internal olefins with gaseous sulfur trioxide-containing gases to make them sulfonated, and neutralizing and thereafter further hydrolyzing the obtained sulfonic acids. Internal olefin sulfonate salts are known to have good biodegradability.

Further, as methods for imparting antisoiling properties or decontaminating properties to hard surfaces, hydrophilizing methods have been conventionally known. If hard surfaces undergo hydrophilization, in other words, treatments to reduce the contact angle of hard surfaces with water to make hard surfaces easy to be wet with water, dirt adhering to hard surfaces after the said treatments is more likely to be removed when washing or the effect of preventing recontamination with dirt can be expected, and in addition, anti-fogging effects on glass, mirrors or the like, static protection, prevention of frost on aluminum fins of heat exchangers, or impartation of antisoiling properties, decontaminating properties or the like to bathtubs and surfaces in restrooms or the like can be expected.

U.S. Pat. No. 5,078,916 discloses a detergent composition comprising an internal olefin sulfonate salt with 8 to 26 carbons, wherein at least 25 mass % thereof is in the beta-hydroxy alkane sulfonate form.

JP-A 2016-35009 discloses a biofilm removing agent composition for use on hard surfaces comprising 1 mass % or more and 40 mass % or less of an internal olefin sulfonate salt.

JP-A 2016-147928 discloses a hand dishwashing detergent composition comprising (a) an internal olefin sulfonate salt with 8 or more and 24 or less carbons, (b) a fatty acid with 8 or more and 22 or less carbons or a salt thereof and (c) one or more compounds selected from (c1) a specific alkanol amide, (c2) a specific fatty acid amide propyl betaine and (c3) a specific polyoxyethylene alkyl or alkenyl amine under their respective predetermined conditions, wherein the mass ratio (c)/(a) is 0.01 or more and 1 or less.

JP-A 2016-147927 discloses a hand dishwashing detergent composition comprising (a) an internal olefin sulfonate salt with 8 or more and 24 or less carbons, (b) a fatty acid with 8 or more and 22 or less carbons or a salt thereof, (c) an amine oxide having a hydrocarbon group with 8 or more and 22 or less carbons and (d) a compound selected from an alkyl succinic acid having an alkyl group with 8 or more and 22 or less carbons, an alkenyl succinic acid having an alkenyl group with 8 or more and 22 or less carbons, salts thereof and anhydrides thereof under their respective predetermined conditions, wherein the mass ratio (d)/(a) is 0.01 or more and 1 or less.

SUMMARY OF THE INVENTION

The present invention provides a cleaning or hydrophilizing agent composition and a method for cleaning or hydrophilizing a hard surface excellent in cleaning power and capable of imparting hydrophilicity to hard surfaces.

The present invention relates to a cleaning or hydrophilizing agent composition containing (A) an anionic surfactant (hereinafter referred to as component (A)), (B) a nonionic surfactant (hereinafter referred to as component (B)) and water, wherein the composition contains (A1) a branched anionic surfactant (hereinafter referred to as component (A1)) as component (A), and (B1) a nonionic surfactant having a hydrocarbon group with 8 or more and 22 or less carbons (hereinafter referred to as component (B1)) as component (B).

Further, the present invention relates to a method for cleaning or hydrophilizing a hard surface including bringing a treatment liquid containing component (A), component (B) and water into contact with the hard surface, wherein the treatment liquid contains component (A1) as component (A) and component (B1) as component (B).

According to the present invention, provided are a cleaning or hydrophilizing agent composition and a method for cleaning or hydrophilizing a hard surface excellent in cleaning power and capable of imparting hydrophilicity to hard surfaces.

EMBODIMENTS OF THE INVENTION

[Cleaning or Hydrophilizing Agent Composition]

<Component (A)>

Component (A) is an anionic surfactant.

The cleaning or hydrophilizing agent composition of the present invention contains (A1) a branched anionic surfactant as component (A). A branched anionic surfactant is an anionic surfactant in which a hydrocarbon group, a hydrophobic part, has a branched structure. Note that, in the present invention, when an anionic surfactant has a hydrocarbon group in which a carbon atom bonded to an anion group, a hydrophilic part, is a secondary or tertiary carbon atom, it may also be considered an anionic surfactant having a branched structure. Note that, in the present invention, as the content of component (A), a value calculated by assuming that a counterion of component (A) is a hydrogen ion, namely, a value in terms of the acid-form compound content is used. Mass ratios pertaining to component (A) are calculated using the content of component (A) expressed in terms of the acid-form compound content.

Examples of component (A1) include an anionic surfactant having a branched hydrocarbon group with 8 or more and 30 or less carbons.

Examples of component (A1) include an anionic surfactant having a branched hydrocarbon group with 8 or more and 30 or less carbons and a sulfate group or a sulfonic acid group.

The branched hydrocarbon group of component (A1) has preferably 8 or more, more preferably 10 or more and further preferably 16 or more, and preferably 30 or less, more preferably 28 or less, further preferably 24 or less, further preferably 22 or less and further preferably 20 or less carbons.

Examples of the branched hydrocarbon group of component (A1) include a branched alkyl group, a branched alkenyl group or an aryl group having a branched alkyl group.

Examples of component (A1) include an anionic surfactant represented by the following general formula (A):

(A)

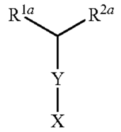

wherein each of $R^{1a}$ and $R^{2a}$ independently represents a hydrocarbon group with 1 or more and 28 or less carbons which may include a substituent or a linking group; X represents a group selected from $SO_3M$, COOM and $OSO_3M$; Y represents a single bond or a phenylene group; and M represents a counterion.

In the formula (A), examples of the hydrocarbon groups of $R^{1a}$ and $R^{2a}$ include an alkyl group, an alkenyl group and an aryl group. An alkyl group or an alkenyl group is preferable.

Each of the hydrocarbon groups of $R^{1a}$ and $R^{2a}$ may include a substituent such as a hydroxyl group or the like or a linking group such as COO group or the like.

$R^{1a}$ and $R^{2a}$ have preferably 7 or more and 29 or less carbons in total. Note that the numbers of carbons of substituents or linking groups are not included in the numbers of carbons of the hydrocarbon groups of $R^{1a}$ and $R^{2a}$.

In the formula (A), X is preferably $SO_3M$.

In the formula (A), examples of M include an alkali metal ion, an alkaline earth metal (½ atom) ion, an ammonium ion or an organic ammonium ion. M is preferably an alkali metal ion, more preferably a sodium ion or a potassium ion, and further preferably a potassium ion.

Y is preferably a single bond.

Examples of component (A1) include one or two or more branched anionic surfactants selected from an internal olefin sulfonate salt (IOS), a linear alkylbenzene sulfonate salt (LAS), a secondary alkane sulfonate salt (SAS) and a dialkyl sulfosuccinate salt (DASS).

Component (A1) is preferably IOS from the viewpoint of improving cleaning performance and hydrophilizing performance. The number of carbons thereof is expressed in terms of the number of carbons of an acid-form compound thereof. Examples of IOS include an alkali metal salt, an alkaline earth metal (½ atom) salt, an ammonium salt or an organic ammonium salt. Examples of the alkali metal salt include a sodium salt and a potassium salt. Examples of the alkaline earth metal salt include a calcium salt and a magnesium salt. Examples of the organic ammonium salt include an alkanol ammonium salt with 2 or more and 6 or less carbons. IOS is preferably an alkali metal salt and more preferably a potassium salt from the viewpoint of improving cleaning performance and hydrophilizing performance.

IOS of the present invention can be obtained by the sulfonation, neutralization, hydrolysis and the like of internal olefins having double bonds inside (at position 2 or higher of) olefin chains. The sulfonation of the internal olefins quantitatively produces β-sultones, and part of the β-sultones changes into γ-sultones and olefin sulfonic acids, which further convert into hydroxy alkane sulfonate salts (H species) and olefin sulfonate salts (O species) in the neutralization and hydrolysis processes (e.g., J. Am. Oil Chem. Soc. 69, 39 (1992)). IOS is a mixture thereof and mainly sulfonate salts with sulfonic acid groups present inside (at position 2 or higher of) hydrocarbon chains (hydroxy alkane chains in H species or olefin chains in O species). The substitution position distribution of sulfonic acid groups in carbon chains of IOS can be quantified by a method such as gas chromatography, nuclear magnetic resonance spectroscopy or the like.

In IOS, the proportion of IOS with a sulfonic acid group present at position 2 of the above hydrocarbon chain is preferably 5% or more and more preferably 10% or more, and preferably 45% or less and more preferably 30% or less on a molar basis or a mass basis from the viewpoint of improving cleaning performance and hydrophilizing performance.

In IOS, the proportion of IOS with a sulfonic acid group present at position 1 of the above hydrocarbon chain is preferably 0.2% or more, more preferably 0.5% or more and further preferably 1.0% or more, and preferably 20% or less, more preferably 10% or less, further preferably 5% or less and furthermore preferably 3% or less on a molar basis or a mass basis from the viewpoint of improving cleaning performance and hydrophilizing performance.

The above hydrocarbon chain of IOS has preferably 8 or more, more preferably 10 or more and further preferably 16 or more carbons from the viewpoint of improving hydrophilizing performance, and preferably 22 or less and more preferably 20 or less carbons from the viewpoint of improving cleaning performance. In other words, from the viewpoint of improving cleaning performance and hydrophilizing performance, the cleaning or hydrophilizing agent composition of the present invention more preferably contains IOS having a hydrocarbon chain with 16 or more and 20 or less carbons as component (A1).

In IOS, the proportion of IOS having a hydrocarbon chain with 16 or more and 20 or less carbons is preferably 50 mass % or more, more preferably 70 mass % or more, further preferably 80 mass % or more, furthermore preferably 90 mass % or more, furthermore preferably 95 mass % or more and furthermore preferably 97 mass % or more, and preferably 100 mass % or less, or may be 100 mass % from the viewpoint of improving cleaning performance and hydrophilizing performance.

In IOS, the molar ratio of H species to O species (H species/O species) is preferably more than 50/50 and more preferably more than 70/30, and preferably 95/5 or less and more preferably 90/10 or less from the viewpoint of improving cleaning performance and hydrophilizing performance.

The cleaning or hydrophilizing agent composition of the present invention may contain components other than component (A1) as component (A). In the cleaning or hydrophilizing agent composition of the present invention, the proportion of component (A1) in component (A) is preferably 30 mass % or more, more preferably 50 mass % or more, further preferably 70 mass % or more and furthermore preferably 90 mass % or more, and preferably 100 mass % or less, or may be 100 mass % from the viewpoint of improving hydrophilizing performance.

<Component (B)>

Component (B) is a nonionic surfactant. The cleaning or hydrophilizing agent composition of the present invention contains (B1) a nonionic surfactant having a hydrocarbon group with 8 or more and 22 or less carbons as component (B).

The hydrocarbon group of component (B1) has 8 or more and preferably 10 or more carbons from the viewpoint of improving cleaning performance, and 22 or less, preferably 18 or less and more preferably 16 or less carbons from the viewpoint of improving hydrophilizing performance.

From the viewpoint of improving cleaning performance and hydrophilizing performance, the cleaning or hydrophilizing agent composition of the present invention preferably contains as component (B1) one or two or more nonionic surfactants selected from (B1-1-1) a nonionic surfactant having a linear hydrocarbon group with 8 or more and 10 or less carbons [hereinafter referred to as component (B1-1-1)], (B1-1-2) a nonionic surfactant having a branched hydrocarbon group with 8 or more and 22 or less carbons [hereinafter referred to as component (B1-1-2)], (B1-2) a nonionic surfactant having a linear hydrocarbon group with 11 or more and 22 or less carbons [hereinafter referred to as component (B1-2)], (B1-3) a nonionic surfactant represented by the following general formula (b4) [hereinafter referred to as component (B1-3)], (B1-4) a nonionic surfactant represented by the following general formula (b5) [hereinafter referred to as component (B1-4)] and (B1-5) a polyoxyalkylene glycerol fatty acid ester [hereinafter referred to as component (B1-5)], $$R^7—O—[(EO)_{n4}(BO)_{n5}]—R^8 \quad (b4)$$

wherein $R^7$ is a hydrocarbon group with 8 or more and 22 or less carbons; $R^8$ is a hydrogen atom or a methyl group; EO group is an ethyleneoxy group; n4 is an average number of added moles and a number selected from the numbers 3 or more and 30 or less; BO group is a butyleneoxy group; n5 is an average number of added moles and a number selected from the numbers 1 or more and 15 or less; and EO and BO may be a random polymer or a block polymer, and $$R^9(OA^4)_xG_y \quad (b5)$$

wherein $R^9$ is a hydrocarbon group with 8 or more and 22 or less carbons; $OA^4$ is one or two or more groups selected from alkyleneoxy groups; G is a residue derived from a sugar with 5 or 6 carbons; x is a number whose average value is 0 or more and 5 or less; and y is a number whose average value is 1 or more and 3 or less.

From the viewpoint of improving cleaning performance and hydrophilizing performance, the cleaning or hydrophilizing agent composition of the present invention more preferably contains as component (B1) one or two or more nonionic surfactants selected from components (B1-1-1) and (B1-1-2) [hereinafter referred to as component (B1-1)].

In the present invention, when a nonionic surfactant has a hydrocarbon group in which a carbon atom bonded to an alkyleneoxy group or the like, a hydrophilic part, is a secondary or tertiary carbon atom, it is also considered a nonionic surfactant having a branched hydrocarbon group.

Examples of the hydrocarbon group of component (B1-1-1) include a group selected from a linear primary alkyl group and a linear primary alkenyl group. Nonionic surfactants qualifying as components (B1-3), (B1-4) and (B1-5) are excluded from component (B1-1-1). Component (B1-1-1) is preferably a nonionic surfactant having one linear hydrocarbon group with 8 or more and 10 or less carbons from the viewpoint of improving cleaning performance and hydrophilizing performance.

Examples of the hydrocarbon group of component (B1-1-2) include a group selected from a branched alkyl group, a linear secondary alkyl group, a branched alkenyl group and a linear secondary alkenyl group. Nonionic surfactants qualifying as components (B1-3), (B1-4) and (B1-5) are excluded from component (B1-1-2). Component (B1-1-2) is preferably a nonionic surfactant having one branched hydrocarbon group with 8 or more and 22 or less carbons from the viewpoint of improving cleaning performance and hydrophilizing performance.

Component (B1-1) may be a nonionic surfactant with an HLB of 11.5 or more and further 12.5 or more, and 15.4 or less and further 15.1 or less.

This HLB is based on Griffin's method. Here, when component (B1-1) includes a polyoxyethylene group, the HLB refers to HLB calculated by the following formula:

HLB=[(average molecular weight of polyoxyethylene group)/(average molecular weight of component (B1-1))]×20 wherein average molecular weight of polyoxyethylene group represents average molecular weight calculated from the average number of added moles of oxyethylene groups when the numbers of added moles of the oxyethylene groups have a distribution, and average molecular weight of component (B1-1) is molecular weight calculated as an average value when hydrophobic groups such as hydrocarbon groups or the like have a distribution or when the numbers of added moles of polyoxyethylene groups have a distribution.

Note that specific examples of nonionic surfactants are listed below and the above oxyethylene groups may be referred to as ethyleneoxy groups therein.

Further, in the present invention, when component (B1-1) does not include a polyoxyethylene group, the HLB of component (B1-1) refers to the one measured by the method of Kunieda et al. described in "Journal of Colloid and Interface Science, Vol. 107, No. 1, September, 1985." The method for measuring HLB described in this literature is based on the finding that there is a linear relationship between a specific temperature (THLB) and Griffin's HLB number.

Examples of component (B1-1-1) include a nonionic surfactant represented by the following general formula (b1):

$$R^1—O—(A^1O)_{n1}—R^2 \quad (b1)$$

wherein $R^1$ is a linear hydrocarbon group with 8 or more and 10 or less carbons; $R^2$ is a hydrogen atom or a methyl group; $A^1O$ group is one or two or more groups selected from alkyleneoxy groups; and n1 is an average number of added moles and a number selected from the numbers 3 or more and 50 or less.

In the general formula (b1), $R^1$ is a linear hydrocarbon group with 8 or more and 10 or less carbons. $R^1$ has 8 or more carbons from the viewpoint of improving cleaning performance, and 10 or less and more preferably 10 carbons from the viewpoint of ensuring hydrophilizing performance.

The linear hydrocarbon group of $R^1$ is preferably a group selected from a linear primary alkyl group and a linear primary alkenyl group, and more preferably a linear primary alkyl group.

In the general formula (b1), $R^2$ is preferably a hydrogen atom.

In the general formula (b1), $A^1O$ group is one or two or more groups selected from alkyleneoxy groups. When two or more alkylneoxy groups are included, they may be bonded in blocks or bonded at random. $A^1O$ group is preferably an ethyleneoxy group from the viewpoint of improving cleaning performance.

In the general formula (b1), n1 is an average number of added moles and a number selected from the numbers 3 or more and 50 or less. The larger the number n1 is, the higher the HLB value is, and the smaller the number n1 is, the lower the HLB value is. n1 is 3 or more and preferably 7 or more from the viewpoint of improving hydrophilizing performance, and 50 or less, preferably 20 or less and more preferably 10 or less from the viewpoints of improving cleaning performance and ensuring the formulation stability of the composition.

Component (B1-1-1) is preferably a polyoxyalkylene decyl or decenyl ether. The oxyalkylene preferably includes an oxyethylene. Component (B1-1-1) is more preferably a polyoxyethylene decyl or decenyl ether.

Examples of component (B1-1-2) include a nonionic surfactant represented by the following general formula (b2):

$$R^3—O-(A^2O)_{n2}—R^4 \quad (b2)$$

wherein $R^3$ is a branched hydrocarbon group with 8 or more and 22 or less carbons; $R^4$ is a hydrogen atom or a methyl group; $A^2O$ group is one or two or more groups selected from alkyleneoxy groups; and n2 is an average number of added moles and a number selected from the numbers 3 or more and 50 or less.

In the general formula (b2), $R^3$ is a branched hydrocarbon group with 8 or more and 22 or less carbons. $R^3$ has 8 or more and preferably 10 or more carbons from the viewpoint of improving cleaning performance, and 22 or less, preferably 18 or less and more preferably 16 or less carbons from the viewpoint of ensuring hydrophilizing performance.

The branched hydrocarbon group of $R^3$ is preferably a group selected from a branched alkyl group, a linear secondary alkyl group, a branched alkenyl group and a linear secondary alkenyl group and more preferably a group selected from a branched alkyl group and a linear secondary alkyl group from the viewpoint of improving cleaning performance and hydrophilizing performance. In the general formula (b2), $R^4$ is preferably a hydrogen atom.

In the general formula (b2), $A^2O$ group is one or two or more groups selected from alkyleneoxy groups. When two or more alkyleneoxy groups are included, they may be bonded in blocks or bonded at random. $A^2O$ group is preferably an ethyleneoxy group from the viewpoint of improving cleaning performance.

In the general formula (b2), n2 is an average number of added moles and a number selected from the numbers 3 or more and 50 or less. The larger the number n2 is, the higher the HLB value is, and the smaller the number n2 is, the lower the HLB value is. n2 is 3 or more, preferably 6 or more, more preferably 8 or more and further preferably 10 or more from the viewpoint of improving hydrophilizing performance, and 50 or less, preferably 20 or less and more preferably 15 or less from the viewpoints of improving cleaning performance and ensuring the formulation stability of the composition.

Component (B1-2) is a nonionic surfactant having a linear hydrocarbon group with 11 or more and 22 or less carbons. Nonionic surfactants qualifying as components (B1-3), (B1-4) and (B1-5) are excluded from component (B1-2).

Examples of component (B1-2) include a nonionic surfactant represented by the following general formula (b3):

$$R^5—O-(A^3O)_{n3}—R^6 \quad (b3)$$

wherein $R^5$ is a linear hydrocarbon group with 11 or more and 22 or less carbons; $R^6$ is a hydrogen atom or a methyl group; $A^3O$ group is one or two or more groups selected from alkyleneoxy groups; and n3 is an average number of added moles and a number selected from the numbers 3 or more and 50 or less.

In the general formula (b3), $R^5$ is a linear hydrocarbon group with 11 or more and 22 or less carbons.

The linear hydrocarbon group of $R^5$ is preferably a group selected from a linear primary alkyl group and a linear primary alkenyl group.

$R^5$ has 11 or more and preferably 12 or more carbons from the viewpoint of improving hydrophilizing performance, and preferably 18 or less, more preferably 16 or less and further preferably 14 or less carbons from the viewpoint of improving cleaning performance.

In the general formula (b3), $R^6$ is preferably a hydrogen atom.

In the general formula (b3), $A^3O$ group is one or two or more groups selected from alkyleneoxy groups. When two or more alkyleneoxy groups are included, they may be bonded in blocks or bonded at random. $A^3O$ group is preferably an ethyleneoxy group from the viewpoint of improving cleaning performance.

In the general formula (b3), n3 is an average number of added moles and a number selected from the numbers 3 or more and 50 or less. The larger the number n3 is, the higher the HLB value is, and the smaller the number n3 is, the lower the HLB value is. n3 is 3 or more, preferably 7 or more and more preferably 10 or more from the viewpoint of improving hydrophilizing performance, and 50 or less, preferably 45 or less, more preferably 40 or less, further preferably 35 or less, furthermore preferably 30 or less and furthermore preferably 25 or less from the viewpoints of improving cleaning performance and ensuring the formulation stability of the composition.

Component (B1-3) is a nonionic surfactant represented by the following general formula (b4):

$$R^7—O—[(EO)_{n4}(BO)_{n5}]—R^8 \quad (b4)$$

wherein $R^7$ is a hydrocarbon group with 8 or more and 22 or less carbons; $R^8$ is a hydrogen atom or a methyl group; EO group is an ethyleneoxy group; n4 is an average number of added moles and a number selected from the numbers 3 or more and 30 or less; BO group is a butyleneoxy group; n5 is an average number of added moles and a number selected from the numbers 1 or more and 15 or less; and EO and BO may be a random polymer or a block polymer.

In the general formula (b4), $R^7$ is a hydrocarbon group with 8 or more and 22 or less carbons.

The hydrocarbon group of $R^7$ is preferably a group selected from a linear primary alkyl group, a linear primary alkenyl group, a branched alkyl group, a linear secondary alkyl group, a branched alkenyl group and a linear secondary alkenyl group, and more preferably a group selected from a linear primary alkyl group and a branched alkyl group.

$R^7$ has 8 or more, preferably 10 or more and more preferably 12 or more carbons from the viewpoint of improving cleaning performance, and 22 or less, preferably 18 or less and more preferably 16 or less carbons from the viewpoint of ensuring hydrophilizing performance.

In the general formula (b4), n4 is an average number of added moles and a number selected from the numbers 3 or more and 30 or less. n4 is preferably 4 or more, more preferably 5 or more and further preferably 6 or more from the viewpoint of solubility, and preferably 25 or less, more preferably 20 or less and further preferably 15 or less from the viewpoint of cleaning properties.

In the general formula (b4), n5 is an average number of added moles and a number selected from the numbers 1 or more and 15 or less. n5 is preferably 2 or more, more preferably 3 or more and further preferably 4 or more from the viewpoint of cleaning properties, and preferably 13 or less, more preferably 11 or less and further preferably 9 or less from the viewpoint of solubility.

Component (B1-4) is a nonionic surfactant represented by the following general formula (b5):

$$R^9(OA^4)_xG_y \quad (b5)$$

wherein $R^9$ is a hydrocarbon group with 8 or more and 22 or less carbons; $OA^4$ is one or two or more groups selected from alkyleneoxy groups; G is a residue derived from a sugar with 5 or 6 carbons; x is a number whose average value is 0 or more and 5 or less; and y is a number whose average value is 1 or more and 3 or less.

In the above general formula (b5), $R^9$ has 8 or more and preferably 10 or more carbons, and 22 or less, preferably 20 or less, more preferably 18 or less and further preferably 16 or less carbons from the viewpoint of attaining both cleaning performance and hydrophilizing performance. It is a linear or branched alkyl group, and preferably a linear alkyl group. The hydrocarbon group of $R^9$ is preferably a group selected from a linear primary alkyl group, a linear primary alkenyl group, a branched alkyl group, a linear secondary alkyl group, a branched alkenyl group and a linear secondary alkenyl group, and more preferably a group selected from a linear primary alkyl group and a branched alkyl group.

$OA^4$ in the above general formula (b5) is one or two or more groups selected from alkyleneoxy groups, and preferably an ethyleneoxy group.

The structure of the residue derived from a sugar with 5 or 6 carbons represented by G in the above general formula (b5) is determined by the sugars of monosaccharides or disaccharides or higher saccharides used. Examples of G include residues derived from monosaccharides such as glucose, galactose, xylose, mannose, lyxose, arabinose or fructose or mixtures or the like thereof, and include residues derived from disaccharides or higher saccharides such as maltose, xylobiose, isomaltose, cellobiose, gentibiose, lactose, sucrose, nigerose, tulanose, raffinose, gentianose or menditose or mixtures or the like thereof. Of these, those preferable as raw materials are glucose and fructose among the monosaccharides and maltose and sucrose among the disaccharides and higher saccharides.

x in the above general formula (b5) is the average number of added moles of $OA^4$ and preferably 0 or more, and preferably 5 or less, more preferably 3 or less and further preferably 1 or less, or may be 0.

When the average value of y in the above general formula (b5) is more than 1, in other words, when sugar chains of disaccharides or higher saccharides are used in the hydrophilic group, binding modes of the sugar chains can include 1-2, 1-3, 1-4 or 1-6 bond or α-, β-pyranoside bond or furanoside bond and any combinations of these binding modes.

The average value of y in the above general formula (b5) is 1 or more, and 3 or less, preferably 2 or less and more preferably 1.5 or less. This value of y (average degree of condensation of sugar) is measured by $^1$H-NMR. As to a specific measuring method, refer to JP-A H8-53696, page 6, column 10, line 26 to page 7, column 11, line 15.

Component (B1-5) is a polyoxyalkylene glycerol fatty acid ester.

As a polyoxyalkylene group of component (B1-5), one or more selected from polyoxyethylene and polyoxypropylene are preferable and polyoxyethylene is more preferable from the viewpoint of water solubility. Further, the average number of added moles of the polyoxyalkylene is preferably 2 or more, more preferably 3 or more and further preferably 4 or more, and preferably 20 or less, more preferably 18 or less, further preferably 16 or less, furthermore preferably 13 or less and furthermore preferably 10 or less from the viewpoint of water solubility.

A fatty acid part of component (B1-5) has preferably 8 or more and more preferably 10 or more, and preferably 22 or less, more preferably 20 or less and further preferably 18 or less carbons from the viewpoint of cleaning properties. Further, the fatty acid part of component (B1-5) is preferably a linear or branched saturated or unsaturated fatty acid, and more preferably a linear or branched saturated fatty acid.

The cleaning or hydrophilizing agent composition of the present invention may contain as component (B) one or two or more nonionic surfactants selected from (B1-1-1) a nonionic surfactant represented by the above general formula (b1), (B1-1-2) a nonionic surfactant represented by the above general formula (b2), (B1-2) a nonionic surfactant represented by the above general formula (b3), (B1-3) a nonionic surfactant represented by the above general formula (b4), (B1-4) a nonionic surfactant represented by the above general formula (b5) and (B1-5) a polyoxyalkylene glycerol fatty acid ester.

In the cleaning or hydrophilizing agent composition of the present invention, the proportion of component (B1) in component (B) is preferably 30 mass % or more, more preferably 50 mass % or more, further preferably 70 mass % or more and further preferably 90 mass % or more, and preferably 100 mass % or less, or may be 100 mass % from the viewpoint of improving hydrophilizing performance.

In the cleaning or hydrophilizing agent composition of the present invention, the proportion of component (B1-1) in component (B1) is preferably 30 mass % or more, more preferably 70 mass % or more and further preferably 90 mass % or more, and preferably 100 mass % or less, or may be 100 mass % from the viewpoint of improving hydrophilizing performance.

<Composition and Others>

The cleaning or hydrophilizing agent composition of the present invention contains component (A) in an amount of preferably 0.01 mass % or more, more preferably 0.1 mass % or more, further preferably 0.5 mass % or more, further preferably 1 mass % or more and further preferably 5 mass % or more from the viewpoint of improving cleaning performance, and preferably 70 mass % or less, more preferably 40 mass % or less, further preferably 20 mass % or less and further preferably 10 mass % or less from the viewpoint of improving hydrophilizing performance.

The cleaning or hydrophilizing agent composition of the present invention contains component (A1) as component (A) in an amount of preferably 0.01 mass % or more, more preferably 0.1 mass % or more, further preferably 0.5 mass % or more, further preferably 1 mass % or more and further preferably 5 mass % or more from the viewpoint of improving cleaning performance, and preferably 70 mass % or less, more preferably 40 mass % or less, further preferably 20 mass % or less and further preferably 10 mass % or less from the viewpoint of improving hydrophilizing performance.

The cleaning or hydrophilizing agent composition of the present invention contains component (B) in an amount of preferably 0.01 mass % or more, more preferably 0.1 mass % or more, further preferably 0.2 mass % or more, further preferably 0.5 mass % or more, further preferably 1 mass % or more and further preferably 2 mass % or more from the viewpoint of improving hydrophilizing performance, and preferably 70 mass % or less, more preferably 10 mass % or less, further preferably 5 mass % or less and further preferably 3 mass % or less from the viewpoint of improving cleaning performance.

The cleaning or hydrophilizing agent composition of the present invention contains component (B1) in an amount of preferably 0.01 mass % or more, more preferably 0.1 mass % or more, further preferably 0.2 mass % or more, furthermore preferably 0.5 mass % or more, further preferably 1 mass % or more and further preferably 2 mass % or more from the viewpoint of improving hydrophilizing performance, and preferably 70 mass % or less, more preferably 10 mass % or less, further preferably 5 mass % or less and further preferably 3 mass % or less from the viewpoint of improving cleaning performance.

In the cleaning or hydrophilizing agent composition of the present invention, the mass ratio of the content of component (A) to the content of component (B), (A)/(B), is preferably 0.1 or more, more preferably 0.2 or more, further preferably 0.5 or more, furthermore preferably 0.7 or more, furthermore preferably 1 or more, furthermore preferably 1.5 or more, furthermore preferably 2 or more and furthermore preferably 2.5 or more, and preferably 15 or less, more preferably 11 or less, further preferably 5 or less, furthermore preferably 4 or less and furthermore preferably 3 or less from the viewpoint of improving cleaning performance and hydrophilizing performance.

In the cleaning or hydrophilizing agent composition of the present invention, the mass ratio of the content of component (A1) to the content of component (B1), (A1)/(B1), is preferably 0.1 or more, more preferably 0.2 or more, further preferably 0.5 or more, furthermore preferably 0.7 or more, furthermore preferably 1 or more, furthermore preferably 1.5 or more, furthermore preferably 2 or more and furthermore preferably 2.5 or more, and preferably 15 or less, more preferably 11 or less, further preferably 5 or less, furthermore preferably 4 or less and furthermore preferably 3 or less from the viewpoint of improving cleaning performance and hydrophilizing performance.

The cleaning or hydrophilizing agent composition of the present invention can contain optional components other than components (A) and (B) in the range that the effects of the present invention are not impaired. Examples of such optional components include a surfactant other than components (A) and (B), a chelating agent, an alkali agent, an enzyme, an inorganic salt (for example, an inorganic salt including calcium or magnesium).

In the cleaning or hydrophilizing agent composition of the present invention, the proportion of the total content of components (A) and (B) in all the surfactants is preferably 60 mass % or more, more preferably 70 mass % or more, further preferably 80 mass % or more and furthermore preferably 90 mass % or more, and preferably 100 mass % or less, or may be 100 mass %.

In the cleaning or hydrophilizing agent composition of the present invention, the proportion of the total content of components (A1) and (B1) in all the surfactants is preferably 60 mass % or more, more preferably 70 mass % or more, further preferably 80 mass % or more and furthermore preferably 90 mass % or more, and preferably 100 mass % or less, or may be 100 mass %.

When the cleaning or hydrophilizing agent composition of the present invention contains components (A1) and (B1-1-1), the proportion of the total content of components (A1) and (B1-1-1) in all the surfactants is preferably 60 mass % or more, more preferably 70 mass % or more, further preferably 80 mass % or more and furthermore preferably 90 mass % or more, and preferably 100 mass % or less, or may be 100 mass %.

When the cleaning or hydrophilizing agent composition of the present invention contains components (A1) and (B1-1-2), the proportion of the total content of components (A1) and (B1-1-2) in all the surfactants is preferably 60 mass % or more, more preferably 70 mass % or more, further preferably 80 mass % or more and furthermore preferably 90 mass % or more, and preferably 100 mass % or less, or may be 100 mass %.

When the cleaning or hydrophilizing agent composition of the present invention contains components (A1) and (B1-2), the proportion of the total content of components (A1) and (B1-2) in all the surfactants is preferably 60 mass % or more, more preferably 70 mass % or more, further preferably 80 mass % or more and furthermore preferably 90 mass % or more, and preferably 100 mass % or less, or may be 100 mass %.

When the cleaning or hydrophilizing agent composition of the present invention contains components (A1) and (B1-3), the proportion of the total content of components (A1) and (B1-3) in all the surfactants is preferably 60 mass % or more, more preferably 70 mass % or more, further preferably 80 mass % or more and furthermore preferably 90 mass % or more, and preferably 100 mass % or less, or may be 100 mass %.

When the cleaning or hydrophilizing agent composition of the present invention contains components (A1) and (B1-4), the proportion of the total content of components (A1) and (B1-4) in all the surfactants is preferably 60 mass % or more, more preferably 70 mass % or more, further preferably 80 mass % or more and furthermore preferably 90 mass % or more, and preferably 100 mass % or less, or may be 100 mass %.

When the cleaning or hydrophilizing agent composition of the present invention contains components (A1) and (B1-5), the proportion of the total content of components (A1) and (B1-5) in all the surfactants is preferably 60 mass % or more, more preferably 70 mass % or more, further preferably 80 mass % or more and furthermore preferably 90 mass % or more, and preferably 100 mass % or less, or may be 100 mass %.

The cleaning or hydrophilizing agent composition of the present invention contains water. Water is used as the balance other than components (A) and (B) and optional components. The cleaning or hydrophilizing agent composition of the present invention can contain water in an amount of, for example, 20 mass % or more and further 30 mass % or more, and 99 mass % or less and further 98 mass % or less.

The pH of the liquid cleaning or hydrophilizing agent composition of the present invention at 20° C. is preferably 3 or more and more preferably 4 or more, and preferably 13 or less and more preferably 12 or less.

The viscosity of the cleaning or hydrophilizing agent composition of the present invention at 20° C. is preferably 1 mPa·s or more and more preferably 2 mPa·s or more, and preferably 10000 mPa·s or less and more preferably 5000 mPa·s or less. This viscosity can be measured by a B-type viscometer ("TVB-10M" manufactured by Toki Sangyo Co., Ltd) with a rotor and rotational speed appropriate for the viscosity. If the viscosity of the composition is too low for the B-type viscometer to measure, it can be measured by a rheometer ("Physica MCR301" manufactured by Anton Paar GmbH) with a cone plate appropriate for the viscosity.

The cleaning or hydrophilizing agent composition of the present invention can be directed to various solid surfaces such as hard surfaces, fabric surfaces, skin surfaces, hair surfaces or the like. The cleaning or hydrophilizing agent composition of the present invention is preferably for use on hard surfaces. Examples of the hard surfaces include hard surfaces made of materials such as plastic, ceramic, metal, wood, glass, rubber, carbon materials or the like. The hard surfaces may be surfaces of hard articles, for example, surfaces of hard articles made of the above materials. Examples of plastic include acrylic resin, polyamide, polycarbonate, melamine, polyvinyl chloride, polyester, polystyrene, polyethylene, polypropylene, ABS, FRP (fiber reinforced plastic) or the like. Examples of metal include alloys such as stainless steel or the like, aluminum, irons such as automotive steel or the like, and others. Examples of rubber include natural rubber, diene synthetic rubber or the like. Examples of wood include wood used for flooring or the like, and others. The wood used for flooring or the like may be surface-treated.

[Method for Cleaning or Hydrophilizing Hard Surface]

The present invention provides a method for cleaning or hydrophilizing a hard surface including bringing a treatment liquid containing component (A), component (B) and water (hereinafter sometimes also referred to as the treatment liquid of the present invention) into contact with the hard surface, wherein the treatment liquid contains component (A1) as component (A) and component (B1) as component (B). Component (A), component (B) and the hard surface are the same as those mentioned in the cleaning or hydrophilizing agent composition of the present invention. The matters mentioned in the cleaning or hydrophilizing agent composition of the present invention can appropriately be applied to the method for cleaning or hydrophilizing a hard surface of the present invention. For example, in the method for cleaning or hydrophilizing a hard surface of the present invention, specific examples of components (A) and (B) or preferable modes of their contents, mass ratios or the like in the treatment liquid are the same as those in the cleaning or hydrophilizing agent composition of the present invention (provided that the cleaning or hydrophilizing agent composition is read as the treatment liquid as necessary).

The treatment liquid of the present invention may be the cleaning or hydrophilizing agent composition of the present invention or may be prepared by mixing the cleaning or hydrophilizing agent composition of the present invention with water.

The treatment liquid of the present invention is a liquid composition containing water, and preferably an aqueous solution or an aqueous dispersion from the viewpoint of handling stability.

The treatment liquid of the present invention contains component (A) in an amount of preferably 0.001 mass % or more, more preferably 0.002 mass % or more and further preferably 0.005 mass % or more from the viewpoint of improving cleaning performance, and preferably 1 mass % or less, more preferably 0.5 mass % or less and further preferably 0.1 mass % or less from the viewpoint of improving hydrophilizing performance.

The treatment liquid of the present invention contains component (A1) as component (A) in an amount of preferably 0.001 mass % or more, more preferably 0.002 mass % or more and further preferably 0.005 mass % or more from the viewpoint of improving cleaning performance, and preferably 1 mass % or less, more preferably 0.5 mass % or less and further preferably 0.1 mass % or less from the viewpoint of improving hydrophilizing performance.

When the cleaning or hydrophilizing agent composition of the present invention contains component (A) or component (A1) in this range, it can be used as-is as the treatment liquid of the present invention.

The treatment liquid of the present invention contains component (B) in an amount of preferably 0.001 mass % or more, more preferably 0.002 mass % or more and further preferably 0.005 mass % or more from the viewpoint of improving hydrophilizing performance, and preferably 0.5 mass % or less, more preferably 0.1 mass % or less and further preferably 0.05 mass % or less from the viewpoint of improving cleaning performance.

The treatment liquid of the present invention contains component (B1) in an amount of preferably 0.001 mass % or more, more preferably 0.002 mass % or more and further preferably 0.005 mass % or more from the viewpoint of improving hydrophilizing performance, and preferably 0.5 mass % or less, more preferably 0.1 mass % or less and further preferably 0.05 mass % or less from the viewpoint of improving cleaning performance.

When the cleaning or hydrophilizing agent composition of the present invention contains component (B) or component (B1) in this range, it can be used as-is as the treatment liquid of the present invention.

In the treatment liquid of the present invention, the mass ratio of the content of component (A) to the content of component (B), (A)/(B), is preferably 0.1 or more, more preferably 0.2 or more, further preferably 0.5 or more, furthermore preferably 0.7 or more, furthermore preferably 1 or more, furthermore preferably 1.5 or more, furthermore preferably 2 or more and furthermore preferably 2.5 or more, and preferably 15 or less, more preferably 11 or less, further preferably 5 or less, furthermore preferably 4 or less and furthermore preferably 3 or less from the viewpoint of improving cleaning performance and hydrophilizing performance.

In the treatment liquid of the present invention, the mass ratio of the content of component (A1) to the content of component (B1), (A1)/(B1), is preferably 0.1 or more, more preferably 0.2 or more, further preferably 0.5 or more, furthermore preferably 0.7 or more, furthermore preferably 1 or more, furthermore preferably 1.5 or more, furthermore preferably 2 or more and furthermore preferably 2.5 or more, and preferably 15 or less, more preferably 11 or less, further preferably 5 or less, furthermore preferably 4 or less and furthermore preferably 3 or less from the viewpoint of improving cleaning performance and hydrophilizing performance.

In the cleaning or hydrophilizing method of the present invention, the treatment liquid of the present invention is brought into contact with the hard surface for preferably 0.1 seconds or more, more preferably 0.5 seconds or more and further preferably 1 second or more, and preferably 90 minutes or less, more preferably 60 minutes or less and further preferably 30 minutes or less.

The temperature of the treatment liquid of the present invention that is brought into contact with the hard surface is preferably 5° C. or more, more preferably 10° C. or more and more preferably 15° C. or more from the viewpoint of improving the cleaning performance of the treatment liquid, and preferably 95° C. or less, more preferably 90° C. or less and more preferably 80° C. or less from the viewpoint of improving hydrophilizing performance.

In the cleaning or hydrophilizing method of the present invention, the hard surface can be scrubbed after the treatment liquid of the present invention is brought into contact with the hard surface.

Further, in the cleaning or hydrophilizing method of the present invention, after the treatment liquid of the present invention is brought into contact with the hard surface, they may be left alone for preferably 10 seconds or more, more preferably 1 minute or more and further preferably 2 minutes or more, and preferably 30 minutes or less, more preferably 15 minutes or less and further preferably 10 minutes or less. The temperature at which they are left alone is preferably 0° C. or more and 80° C. or less.

In the cleaning or hydrophilizing method of the present invention, the hard surface can be rinsed with water after the treatment liquid of the present invention is brought into contact with the hard surface and preferably thereafter they are left alone as mentioned above. The hydrophilization effect brought about by the treatment liquid of the present invention is maintained even if the hard surface is rinsed after treated. Therefore, objects for which rinsing is desirable receive more advantageous effect. The hard surface can be dried after rinsed. For rinsing, water having the same hardness as the water used to prepare the treatment liquid of the present invention is preferably used. For example, water with a hardness of 4° dH or more and 100° dH or less can be used for rinsing.

A method for bringing the treatment liquid of the present invention into contact with the hard surface is not particularly limited. Examples thereof include, for example, the following methods (i) to (iii) or the like:

(i) a method in which the hard surface is immersed in the treatment liquid of the present invention;

(ii) a method in which the treatment liquid of the present invention is sprayed or applied on the hard surface; and (iii) a method in which the hard surface is cleaned or hydrophilized with the treatment liquid of the present invention in the usual manner.

In the above method (i), the immersion time is preferably 0.5 minutes or more and more preferably 1 minute or more, and preferably 60 minutes or less and more preferably 50 minutes or less from the viewpoints of enhancing the hydrophilizing performance of the treatment liquid of the present invention and economy.

In the above method (ii), a method for spraying or applying the treatment liquid of the present invention on the hard surface can be appropriately selected depending on the size (area) of the solid surface or the like. Preferable is a method in which the treatment liquid of the present invention is sprayed on the hard surface by a spray or the like and the hard surface is thereafter dried. As necessary, the hard surface may be rinsed with water after spraying. In addition, the treatment liquid may be spread thinly with a sponge or the like after sprayed.

For example, when the treatment liquid of the present invention contains component (A) of the present invention in an amount of 0.1 mass %, the treatment liquid of the present invention is sprayed or applied on the hard surface in an amount of preferably 0.001 mL or more and 1 mL or less per 10 $cm^2$.

In the above method (iii), the treatment liquid of the present invention is preferably used and brought into contact with the hard surface in the form of the cleaning or hydrophilizing agent composition containing components (A) and (B) of the present invention. When it takes the form of the cleaning or hydrophilizing agent composition, the pH is preferably 4 or more, and preferably 10 or less and more preferably 8 or less from the viewpoints of safety in handling and preventing the hard surface from being damaged.

In connection with the above embodiments, the present invention further discloses the following cleaning or hydrophilizing agent compositions and methods for cleaning or hydrophilizing a hard surface. The matters mentioned in the cleaning or hydrophilizing agent composition and method for cleaning or hydrophilizing a hard surface of the present invention can appropriately be applied to these aspects, and vice versa.

<1>

A cleaning or hydrophilizing agent composition containing (A) an anionic surfactant (hereinafter referred to as component (A)), (B) a nonionic surfactant (hereinafter referred to as component (B)) and water, wherein the composition contains (A1) a branched anionic surfactant (hereinafter referred to as component (A1)) as component (A), and (B1) a nonionic surfactant having a hydrocarbon group with 8 or more and 22 or less carbons (hereinafter referred to as component (B1)) as component (B).

<2>

The cleaning or hydrophilizing agent composition according to <1>, wherein the mass ratio of the content of component (A) to the content of component (B), (A)/(B), is preferably 0.1 or more, more preferably 0.2 or more, further preferably 0.5 or more, furthermore preferably 0.7 or more, furthermore preferably 1 or more, furthermore preferably 1.5 or more, furthermore preferably 2 or more and furthermore preferably 2.5 or more, and preferably 15 or less, more preferably 11 or less, further preferably 5 or less, furthermore preferably 4 or less and furthermore preferably 3 or less.

<3>

The cleaning or hydrophilizing agent composition according to <1> or <2>, wherein the mass ratio of the content of component (A1) to the content of component (B1), (A1)/(B1), is preferably 0.1 or more, more preferably 0.2 or more, further preferably 0.5 or more, furthermore preferably 0.7 or more, furthermore preferably 1 or more, furthermore preferably 1.5 or more, furthermore preferably 2 or more and furthermore preferably 2.5 or more, and preferably 15 or less, more preferably 11 or less, further preferably 5 or less, furthermore preferably 4 or less and furthermore preferably 3 or less.

<4>

The cleaning or hydrophilizing agent composition according to any of <1> to <3>, wherein the content of component (A1) is preferably 0.01 mass % or more, more preferably 0.1 mass % or more, further preferably 0.5 mass % or more, further preferably 1 mass % or more and further preferably 5 mass % or more, and preferably 70 mass % or less, more preferably 40 mass % or less, further preferably 20 mass % or less and further preferably 10 mass % or less from the viewpoint of improving hydrophilizing performance.

<5>

The cleaning or hydrophilizing agent composition according to any of <1> to <4>, wherein the content of component (B1) is preferably 0.01 mass % or more, more preferably 0.1 mass % or more, further preferably 0.2 mass % or more, furthermore preferably 0.5 mass % or more, further preferably 1 mass % or more and further preferably 2 mass % or more, and preferably 70 mass % or less, more preferably 10 mass % or less, further preferably 5 mass % or less and further preferably 3 mass % or less from the viewpoint of improving cleaning performance.

<6>

The cleaning or hydrophilizing agent composition according to any of <1> to <5>, wherein component (A1) is one or two or more selected from an internal olefin sulfonate salt, an alkylbenzene sulfonate salt, a secondary alkane sulfonate salt and a dialkyl sulfosuccinate salt.

<7>

The cleaning or hydrophilizing agent composition according to any of <1> to <6>, wherein component (A1) is an anionic surfactant having a branched hydrocarbon group with 8 or more and 30 or less carbons and preferably an anionic surfactant having a branched hydrocarbon group with 8 or more and 30 or less carbons and a sulfate group or a sulfonic acid group.

<8>

The cleaning or hydrophilizing agent composition according to any of <1> to <7>, wherein component (A1) has a branched hydrocarbon group with preferably 8 or more, more preferably 10 or more and further preferably 16 or more, and preferably 30 or less, more preferably 28 or less, further preferably 24 or less, further preferably 22 or less and further preferably 20 or less carbons, and examples of the branched hydrocarbon group of component (A1) include a branched alkyl group, a branched alkenyl group or an aryl group having a branched alkyl group.

<9>

The cleaning or hydrophilizing agent composition according to any of <1> to <8>, wherein component (A1) is an internal olefin sulfonate salt (hereinafter referred to as IOS).

<10>

The cleaning or hydrophilizing agent composition according to <9>, wherein IOS has a hydrocarbon chain with 8 or more and 22 or less carbons.

<11>

The cleaning or hydrophilizing agent composition according to <9> or <10>, wherein, in IOS, the proportion of IOS with a sulfonic acid group present at position 2 of the hydrocarbon chain is preferably 5% or more and more preferably 10% or more, and preferably 45% or less and more preferably 30% or less on a molar basis or a mass basis.

<12>

The cleaning or hydrophilizing agent composition according to any of <9> to <11>, wherein, in IOS, the proportion of IOS with a sulfonic acid group present at position 1 of the hydrocarbon chain is preferably 0.2% or more, more preferably 0.5% or more and further preferably 1.0% or more, and preferably 20% or less, more preferably 10% or less, further preferably 5% or less and furthermore preferably 3% or less on a molar basis or a mass basis.

<13>

The cleaning or hydrophilizing agent composition according to any of <9> to <12>, wherein, in IOS, the proportion of IOS having a hydrocarbon chain with 16 or more and 20 or less carbons is preferably 50 mass % or more, more preferably 70 mass % or more, further preferably 80 mass % or more, furthermore preferably 90 mass % or more, furthermore preferably 95 mass % or more and furthermore preferably 97 mass % or more, and preferably 100 mass % or less, or 100 mass %.

<14>

The cleaning or hydrophilizing agent composition according to any of <9> to <13>, wherein, in IOS, the molar ratio of hydroxy alkane sulfonate salts (H species) to olefin sulfonate salts (O species) (H species/O species) is preferably more than 50/50 and more preferably more than 70/30, and preferably 95/5 or less and more preferably 90/10 or less.

<15>

The cleaning or hydrophilizing agent composition according to any of <1> to <14>, wherein component (B1) is one or two or more nonionic surfactants selected from (B1-1-1) a nonionic surfactant having a linear hydrocarbon group with 8 or more and 10 or less carbons [hereinafter referred to as component (B1-1-1)], (B1-1-2) a nonionic surfactant having a branched hydrocarbon group with 8 or more and 22 or less carbons [hereinafter referred to as component (B1-1-2)], (B1-2) a nonionic surfactant having a linear hydrocarbon group with 11 or more and 22 or less carbons, (B1-3) a nonionic surfactant represented by the following general formula (b4), (B1-4) a nonionic surfactant represented by the following general formula (b5) and (B1-5) a polyoxyalkylene glycerol fatty acid ester, $$R^7—O—[(EO)_{n4}(BO)_{n5}]—R^8 \quad (b4)$$

wherein $R^7$ is a hydrocarbon group with 8 or more and 22 or less carbons; $R^8$ is a hydrogen atom or a methyl group; EO group is an ethyleneoxy group; n4 is an average number of added moles and a number selected from the numbers 3 or more and 30 or less; BO group is a butyleneoxy group; n5 is an average number of added moles and a number selected from the numbers 1 or more and 15 or less; and EO and BO may be a random polymer or a block polymer, and $$R^9(OA^4)_xG_y \quad (b5)$$

wherein $R^9$ is a hydrocarbon group with 8 or more and 22 or less carbons; $OA^4$ is one or two or more groups selected from alkyleneoxy groups; G is a residue derived from a sugar with 5 or 6 carbons; x is a number whose average value is 0 or more and 5 or less; and y is a number whose average value is 1 or more and 3 or less.

<16>

The cleaning or hydrophilizing agent composition according to any of <1> to <15>, wherein component (B1) is one or two or more nonionic surfactants selected from (B1-1-1) a nonionic surfactant having a linear hydrocarbon group with 8 or more and 10 or less carbons (hereinafter referred to as component (B1-1-1)) and (B1-1-2) a nonionic surfactant having a branched hydrocarbon group with 8 or more and 22 or less carbons (hereinafter referred to as component (B1-1-2)).

<17>

The cleaning or hydrophilizing agent composition according to <15> or <16>, wherein component (B1-1-1) is a nonionic surfactant represented by the following general formula (b1):

$$R^1—O-(A10)_{n1}—R^2 \quad (b1)$$

wherein $R^1$ is a linear hydrocarbon group with 8 or more and 10 or less carbons; $R^2$ is a hydrogen atom or a methyl group; $A^1O$ group is one or two or more groups selected from alkyleneoxy groups; and n1 is an average number of added moles and a number selected from the numbers 5 or more and 50 or less.

<18>

The cleaning or hydrophilizing agent composition according to any of <15> to <17>, wherein component (B1-1-1) is a polyoxyethylene decyl or decenyl ether.

<19>

The cleaning or hydrophilizing agent composition according to any of <15> to <18>, wherein component (B1-1-2) is a nonionic surfactant represented by the following general formula (b2):

$$R^3—O-(A2O)_{n2}—R^4 \quad (b2)$$

wherein $R^3$ is a branched hydrocarbon group with 8 or more and 22 or less carbons; $R^4$ is a hydrogen atom or a methyl group; $A^2O$ group is one or two or more groups selected from alkyleneoxy groups; and n2 is an average number of added moles and a number selected from the numbers 3 or more and 50 or less.

<20>

The cleaning or hydrophilizing agent composition according to any of <15> to <19>, wherein component (B1-2) is a nonionic surfactant represented by the following general formula (b3):

$$R^5—O-(A^3O)_{n3}—R^6 \quad (b3)$$

wherein $R^5$ is a linear hydrocarbon group with 11 or more and 22 or less carbons; $R^6$ is a hydrogen atom or a methyl group; $A^3O$ group is one or two or more groups selected from alkyleneoxy groups; and n3 is an average number of added moles and a number selected from the numbers 3 or more and 50 or less.

<21>

The cleaning or hydrophilizing agent composition according to any of <15> to <20>, wherein component (B1-3) is a nonionic surfactant represented by the following general formula (b4):

$$R^7—O—[(EO)_{n4}(BO)_{n5}]—R^8 \quad (b4)$$

wherein $R^7$ is a hydrocarbon group with 8 or more and 22 or less carbons; $R^8$ is a hydrogen atom or a methyl group; EO group is an ethyleneoxy group; n4 is an average number of added moles and a number selected from the numbers 3 or more and 30 or less; BO group is a butyleneoxy group; n5 is an average number of added moles and a number selected from the numbers 1 or more and 15 or less; and EO and BO may be a random polymer or a block polymer.

<22>

The cleaning or hydrophilizing agent composition according to any of <15> to <21>, wherein component (B1-4) is a nonionic surfactant represented by the following general formula (b5):

$$R^9(OA^4)_xG_y \quad (b5)$$

wherein $R^9$ is a hydrocarbon group with 8 or more and 22 or less carbons; $OA^4$ is one or two or more groups selected from alkyleneoxy groups; G is a residue derived from a sugar with 5 or 6 carbons; x is a number whose average value is 0 or more and 5 or less; and y is a number whose average value is 1 or more and 3 or less.

<23>

The cleaning or hydrophilizing agent composition according to any of <1> to <22>, wherein the composition is for use on hard surfaces.

<24>

A method for cleaning or hydrophilizing a hard surface including bringing a treatment liquid containing (A) an anionic surfactant (hereinafter referred to as component (A)), (B) a nonionic surfactant (hereinafter referred to as component (B)) and water into contact with the hard surface, wherein the treatment liquid contains, (A1) a branched anionic surfactant as component (A), and (B1) a nonionic surfactant having a hydrocarbon group with 8 or more and 22 or less carbons as component (B).

<25>

The method for cleaning or hydrophilizing a hard surface according to <24>, wherein the hard surface is rinsed with water after the treatment liquid is brought into contact with the hard surface.

<26>

The method for cleaning or hydrophilizing a hard surface according to <24> or <25>, wherein the treatment liquid is obtained by mixing the cleaning or hydrophilizing agent composition according to any of <1> to <23> with water.

EXAMPLES

As the components in the tables, the following were used.

<Component (A)>

[Production Example 1] (Production of C18-IOS-K)

An internal olefin sulfonate potassium salt with 18 carbons (C18-IOS-K) can be obtained, for example, in accordance with the following production example.

A flask with a stirrer is charged with 7000 parts by mass of 1-octadecanol ("KALCOL 8098" manufactured by Kao Corporation) and 700 parts by mass of γ-alumina (manufactured by Strem Chemicals, Inc.) as a catalyst, and a reaction is carried out under stirring at 280° C. with nitrogen flowing through the system, so that a crude internal olefin can be obtained. The crude internal olefin is distilled at 148-158° C. and 0.5 mmHg, so that an internal olefin with 18 carbons having an olefin purity of 100% can be obtained. The internal olefin is placed in a thin-film sulfonation reactor, and under the condition of passing cooling water at 20° C. through an outer jacket of the reactor, a sulfonation reaction is carried out using a sulfur trioxide gas with an $SO_3$ concentration of 2.8 volume %. The flowing amounts of the internal olefin and $SO_3$ are set such that the reaction molar ratio ($SO_3$/internal olefin) is 1.09, at which ratio the reaction is carried out. The resultant sulfonated product is added to an aqueous potassium hydroxide solution in an amount equivalent to 1.2 molar times the theoretical acid value and stirred at 30° C. for an hour to carry out neutralization. The neutralized product is hydrolyzed by heating in an autoclave at 160° C. for an hour, so that a crude product of the internal olefin sulfonate potassium salt can be obtained. The crude product and ethanol are placed in a separating funnel, to which petroleum ether is added to extract and remove oil-soluble impurities. This operation is performed three times and the water phase side is evaporated to dryness, so that the internal olefin sulfonate potassium salt with 18 carbons (C18-IOS-K) can be obtained.

Note that the formulation amount of component (A) in the tables is expressed in terms of that of the acid-form compound (C18-IOS-H).

[Production Example 2] (Production of C16-IOS-K)

An internal olefin sulfonate potassium salt with 16 carbons (C16-IOS-K) can be obtained, for example, in accordance with the following production example.

A flask with a stirrer is charged with 7000 parts by mass of 1-hexadecanol ("KALCOL 6098" manufactured by Kao Corporation) and 700 parts by mass of γ-alumina (manufactured by Strem Chemicals, Inc.) as a catalyst, and a reaction is carried out under stirring at 280° C. with nitrogen flowing through the system, so that a crude internal olefin can be obtained. The crude internal olefin is distilled at 148-158° C. and 0.5 mmHg, so that an internal olefin with 18 carbons having an olefin purity of 100% can be obtained. The internal olefin is placed in a thin-film sulfonation reactor, and under the condition of passing cooling water at 20° C. through an outer jacket of the reactor, a sulfonation reaction is carried out using a sulfur trioxide gas with an $SO_3$ concentration of 2.8 volume %. The flowing amounts of the internal olefin and $SO_3$ are set such that the reaction molar ratio ($SO_3$/internal olefin) is 1.09, at which ratio the reaction is carried out. The resultant sulfonated product is added to an aqueous potassium hydroxide solution in an amount equivalent to 1.2 molar times the theoretical acid value and stirred at 30° C. for an hour to carry out neutralization. The neutralized product is hydrolyzed by heating in an autoclave at 160° C. for an hour, so that a crude product of the internal olefin sulfonate potassium salt can be obtained. The crude product and ethanol are placed in a separating funnel, to which petroleum ether is added to extract and remove oil-soluble impurities. This operation is performed three times and the water phase side is evaporated to dryness, so that the internal olefin sulfonate potassium salt with 18 carbons (C16-IOS-K) can be obtained.

Note that the formulation amount of component (A) in the tables is expressed in terms of that of the acid-form compound (C16-IOS-H).

LAS: sodium dodecylbenzene sulfonate, NEOPELEX G-15, manufactured by Kao Corporation <Component (B)>

C10 (Guerbet)EO8: component (B1-1-2), a nonionic surfactant obtained by adding an average of 8 moles of ethylene oxide to a Guerbet alcohol with 10 carbons, Lutensol XP 80, manufactured by BASF Corporation C10(Guerbet)EO14: component (B1-1-2), a nonionic surfactant obtained by adding an average of 14 moles of ethylene oxide to a Guerbet alcohol with 10 carbons, Lutensol XP 140, manufactured by BASF Corporation Sec-(C12-14)EO5: component (B1-1-2), a nonionic surfactant obtained by adding an average of 5 moles of ethylene oxide to a secondary alcohol with 12 to 14 carbons, NIKKOL BT-5, manufactured by Nikko Chemicals Co., Ltd.

Sec-(C12-14)EO7: component (B1-1-2), a nonionic surfactant obtained by adding an average of 7 moles of ethylene oxide to a secondary alcohol with 12 to 14 carbons, NIKKOL BT-7, manufactured by Nikko Chemicals Co., Ltd.

Sec-(C12-14)EO9: component (B1-1-2), a nonionic surfactant obtained by adding an average of 9 moles of ethylene oxide to a secondary alcohol with 12 to 14 carbons, NIKKOL BT-9, manufactured by Nikko Chemicals Co., Ltd.

Sec-(C12-14)EO12: component (B1-1-2), a nonionic surfactant obtained by adding an average of 12 moles of ethylene oxide to a secondary alcohol with 12 to 14 carbons, NIKKOL BT-12, manufactured by Nikko Chemicals Co., Ltd.

C12EO3: component (B1-2), a nonionic surfactant obtained by adding an average of 3 moles of ethylene oxide to a linear primary alcohol with 12 carbons, EMULGEN 103, manufactured by Kao Corporation C12EO6: component (B1-2), a nonionic surfactant obtained by adding an average of 6 moles of ethylene oxide to a linear primary alcohol with 12 carbons, EMULGEN 108, manufactured by Kao Corporation C12EO9: component (B1-2), a nonionic surfactant obtained by adding an average of 9 moles of ethylene oxide to a linear primary alcohol with 12 carbons, EMULGEN 109P, manufactured by Kao Corporation C12EO12: component (B1-2), a nonionic surfactant obtained by adding an average of 12 moles of ethylene oxide to a linear primary alcohol with 12 carbons, EMULGEN 120, manufactured by Kao Corporation C12EO16: component (B1-2), a nonionic surfactant obtained by adding an average of 16 moles of ethylene oxide to a linear primary alcohol with 12 carbons, EMULGEN 116, manufactured by Kao Corporation C12EO21: component (B1-2), a nonionic surfactant obtained by adding an average of 21 moles of ethylene oxide to a linear primary alcohol with 12 carbons, EMULGEN 121, manufactured by Kao Corporation C12EO41: component (B1-2), a nonionic surfactant obtained by adding an average of 41 moles of ethylene oxide to a linear primary alcohol with 12 carbons, EMULGEN 130K, manufactured by Kao Corporation C12EO47: component (B1-2), a nonionic surfactant obtained by adding an average of 47 moles of ethylene oxide to a linear primary alcohol with 12 carbons, EMULGEN 150, manufactured by Kao Corporation C10EO5: component (B1-1-1), a nonionic surfactant obtained by adding an average of 5 moles of ethylene oxide to a linear primary alcohol with 10 carbons, Lutensol ON50, manufactured by BASF Corporation C10EO8: component (B1-1-1), a nonionic surfactant obtained by adding an average of 8 moles of ethylene oxide to a linear primary alcohol with 10 carbons, Lutensol ON80, manufactured by BASF Corporation Plurafac LF221: component (B1-3), a nonionic surfactant obtained by adding ethylene oxide and butylene oxide to an aliphatic alcohol, Plurafac LF221, manufactured by BASF Corporation C8-10APG: component (B1-4), a compound of the general formula (b5) in which $R^9$ is an alkyl group with 8 to 10 carbons, x is 0, y is 1.5 to 1.8 and G is a residue derived from glucose, Glucopon 225DK, manufactured by BASF Corporation C8-16APG: component (B1-4), a compound of the general formula (b5) in which $R^9$ is an alkyl group with 8 to 16 carbons, x is 0, y is 1.45 to 1.75 and G is a residue derived from glucose, Glucopon 650EC, manufactured by BASF Corporation C10-16APG: component (B1-4), a compound of the general formula (b5) in which $R^9$ is an alkyl group with 10 to 16 carbons, x is 0, y is 1.35 to 1.45 and G is a residue derived from glucose, MYDOL 10, manufactured by Kao Corporation C12-14APG: component (B1-4), a compound of the general formula (b5) in which $R^9$ is an alkyl group with 12 to 14 carbons, x is 0, y is 1.35 to 1.45 and G is a residue derived from glucose, MYDOL 12, manufactured by Kao Corporation Levenol F200: component (B1-5), polyoxyethylene (6) glycerol coconut oil fatty acid ester (shown in parentheses is the number of added moles of ethylene oxide), Levenol F200, manufactured by Kao Corporation <Cleaning Test>

A mixture of 100 g of beef tallow, 100 g of soybean oil, 2.5 g of a monooleic acid, 1.0 g of Sudan III (manufactured by Wako Pure Chemical Corporation) and 600 mL of chloroform was used as model dirt. A 76 mm×26 mm glass slide (S2441 manufactured by Matsunami Glass Ind., Ltd.) to both surfaces of which the prepared model dirt was uniformly applied in a total amount on both surfaces of 0.04 g was used as a model fat-contaminated glass slide.

Deionized water to which calcium chloride and magnesium chloride were added in proportions of 2:1 by mass ratio to adjust the hardness to 8° dH was used for cleaning. Each of the cleaning or hydrophilizing agent compositions listed in Tables 1 to 4 was mixed with 0.7 L of the prepared water to obtain a treatment liquid. The composition was mixed such that the total concentration of components (A) and (B) in the treatment liquid was 0.023 mass %. Using the Leenert's tester, a 1-liter glass beaker for cleaning tests containing 0.7 L of the treatment liquid and six model fat-contaminated glass slides (S2441 manufactured by Matsunami Glass Ind., Ltd.) was set on the tester. Setting the temperature of the treatment liquid to 30° C., stirring was carried out at a stirring rate of 250 rpm for 3 minutes to clean the glass slides. The glass slides after cleaning were transferred to a beaker containing 0.7 L of 8° dH water, with which they were rinsed at a stirring rate of 250 rpm for a minute, and dried at room temperature.

The cleaning rates of the model fat-contaminated glass slides obtained in the above cleaning test were each calculated by the following formula. The values in Tables 1 to 4 are average values of the cleaning rates of six slides.

Cleaning rate (%)=[1−(weight of glass after cleaning−weight of glass before applying model fat)/(weight of glass after applying model fat-weight of glass before applying model fat)]×100

<Treatment for Hydrophilization Evaluation and Method for Measuring Contact Angle>

Using polypropylene Tupperware with a capacity of 0.85 L (manufactured by ASVEL Co. Ltd.), each of the cleaning or hydrophilizing agent compositions listed in Tables 1 to 4 was mixed to 0.5 L of the above prepared water with a hardness of 8° dH to obtain a treatment liquid. The composition was added such that the total concentration of components (A) and (B) in the treatment liquid was 0.025 mass %, thereby obtaining the treatment liquid. Keeping the treatment temperature constant at 25° C., the solution was mixed at a stirring rate of 70 rpm for 15 minutes in a bio-shaker. Next, one 26 mm×76 mm glass plate (manufactured by Akebono Shokai Corporation) was added and stirred at a stirring rate of 70 rpm for 15 minutes. After stirring, the cleaning water was discarded from Tupperware, to which 0.5 L of rinsing water with a hardness of 8° dH was newly added, with which the glass plate was rinsed by stirring at a stirring rate of 70 rpm for a minute. After rinsing twice, the glass plate which underwent hydrophilization was dried at room temperature overnight.

The contact angle of water on the glass after drying was measured with an automatic contact angle meter (DM-501Hi). The values in Tables 1 to 4 are average values of the contact angles at three places. Note that the contact angle on the glass before hydrophilization was 32.9°.

TABLE 1

| | | | | | Example | | Comparative example |
|---|---|---|---|---|---|---|---|
| | | | | | 1 | 2 | 1 |
| Cleaning agent composition | Formulation amount (mass %) | (A) | (A1) | C18-IOS-K | 6.8 | 6.8 | 9.0 |
| | | (B) | (B1-1-2) | C10(Guerbet)EO8 | 2.5 | | |
| | | | | C10(Guerbet)EO14 | | 2.5 | |
| | | Water | | | Balance | Balance | Balance |
| | | Total | | | 100 | 100 | 100 |
| | | (A)/(B) (mass ratio) | | | 2.7 | 2.7 | — |
| Evaluation | | Cleaning performance | | Cleaning rate (%) | 83 | 89 | 62 |
| | | Degree of hydrophilization | | Waterdrop contact angle (°) | 23 | 15 | 14 |

TABLE 2

| | | | | | Example | | | | | |
|---|---|---|---|---|---|---|---|---|---|---|
| | | | | | 3 | 4 | 5 | 6 | 7 | 8 |
| Cleaning agent composition | Formulation amount (mass %) | (A) | (A1) | C18-IOS-K | 6.8 | 6.8 | 6.8 | 6.8 | 4.5 | 2.3 |
| | | | | C16-IOS-K | | | | | | |
| | | | | LAS | | | | | | |
| | | (B) | (B1-1-2) | Sec-(C12-14)EO5 | 2.5 | | | | | |
| | | | | Sec-(C12-14)E07 | | 2.5 | | | | |
| | | | | Sec-(C12-14)E09 | | | 2.5 | | | |
| | | | | Sec-(C12-14)EO12 | | | | 2.5 | 5 | 7.5 |
| | | | | Water | Balance | Balance | Balance | Balance | Balance | Balance |
| | | | | Total | 100 | 100 | 100 | 100 | 100 | 100 |
| | | (A)/(B) (mass ratio) | | | 2.7 | 2.7 | 2.7 | 2.7 | 0.9 | 0.3 |
| Evaluation | | Cleaning performance | | Cleaning rate (%) | 92 | 91 | 91 | 90 | 90 | 85 |
| | | Degree of hydrophilization | | Waterdrop contact angle (°) | 31 | 19 | 17 | 10 | 20 | 27 |

TABLE 2-continued

| | | | | | Example 9 | Example 10 | Example 11 | Example 12 | Comparative example 1 | Comparative example 2 |
|---|---|---|---|---|---|---|---|---|---|---|
| Cleaning agent com-position | Formulation amount (mass %) | (A) | (A1) | C18-IOS-K | 0.9 | 9.1 | | | 9.0 | |
| | | | | C16-IOS-K | | | 6.8 | | | |
| | | | | LAS | | | | 6.8 | | |
| | | (B) | (B1-1-2) | Sec-(C12-14)EO5 | | | | | | |
| | | | | Sec-(C12-14)E07 | | | | | | |
| | | | | Sec-(C12-14)E09 | | | | | | |
| | | | | Sec-(C12-14)EO12 | 9 | 0.9 | 2.5 | 2.5 | | 10 |
| | | Water | | | Balance | Balance | Balance | Balance | Balance | Balance |
| | | Total | | | 100 | 100 | 100 | 100 | 100 | 100 |
| | | (A)/(B) (mass ratio) | | | 0.1 | 10.1 | 2.7 | 2.7 | — | |
| Evaluation | | Cleaning performance | | Cleaning rate (%) | 83 | 87 | 92 | 75 | 62 | 17 |
| | | Degree of hydrophilization | | Waterdrop contact angle (°) | 30 | 10 | 28 | 31 | 14 | 34 |

TABLE 3

| | | | | | Example 13 | Example 14 | Example 15 | Example 16 | Example 17 | Example 18 | Example 19 | Example 20 | Comparative example 1 |
|---|---|---|---|---|---|---|---|---|---|---|---|---|---|
| Cleaning agent com-position | Formulation amount (mass %) | (A) | (A1) | C18-IOS-K | 6.8 | 6.8 | 6.8 | 6.8 | 6.8 | 6.8 | 6.8 | 6.8 | 9.0 |
| | | (B) | (B1-2) | C12EO3 | 2.5 | | | | | | | | |
| | | | | C12E06 | | 2.5 | | | | | | | |
| | | | | C12E09 | | | 2.5 | | | | | | |
| | | | | C12EO12 | | | | 2.5 | | | | | |
| | | | | C12EO16 | | | | | 2.5 | | | | |
| | | | | C12EO21 | | | | | | 2.5 | | | |
| | | | | C12EO41 | | | | | | | 2.5 | | |
| | | | | C12EO47 | | | | | | | | 2.5 | |
| | | Water | | | Balance | Balance | Balance | Balance | Balance | Balance | Balance | Balance | Balance |
| | | Total | | | 100 | 100 | 100 | 100 | 100 | 100 | 100 | 100 | 100 |
| | | (A)/(B) (mass ratio) | | | 2.7 | 2.7 | 2.7 | 2.7 | 2.7 | 2.7 | 2.7 | 2.7 | — |
| Evaluation | | Cleaning performance | | Cleaning rate (%) | 95 | 97 | 96 | 96 | 95 | 95 | 89 | 84 | 62 |
| | | Degree of hydro-philization | | Waterdrop contact angle (°) | 28 | 26 | 24 | 21 | 21 | 20 | 31 | 31 | 14 |

TABLE 4

| | | | | | Example 21 | Example 22 | Example 23 | Example 24 | Example 25 | Example 26 | Example 27 | Example 28 | Com-parative example 1 |
|---|---|---|---|---|---|---|---|---|---|---|---|---|---|
| Cleaning agent com-position | Formu-lation amount (mass %) | (A) | (A1) | C18-IOS-K | 6.8 | 6.8 | 6.8 | 6.8 | 6.8 | 6.8 | 6.8 | 6.8 | 9.0 |
| | | (B) | (B1-1-1) | C10EO5 | 2.5 | | | | | | | | |
| | | | | C10E08 | | 2.5 | | | | | | | |
| | | | (B1-3) | Plurafac LF221 | | | 2.5 | | | | | | |
| | | | (B1-4) | C8-10APG | | | | 2.5 | | | | | |
| | | | | C8-16APG | | | | | 2.5 | | | | |
| | | | | C10-16APG | | | | | | 2.5 | | | |
| | | | | C12-14APG | | | | | | | 2.5 | | |
| | | | (B1-5) | Levenol F200 | | | | | | | | 2.5 | |
| | | Water | | | Balance | Balance | Balance | Balance | Balance | Balance | Balance | Balance | Balance |
| | | Total | | | 100 | 100 | 100 | 100 | 100 | 100 | 100 | 100 | 100 |
| | | (A)/(B) (mass ratio) | | | 2.7 | 2.7 | 2.7 | 2.7 | 2.7 | 2.7 | 2.7 | 2.7 | — |

TABLE 4-continued

| | | | Example | | | | | | | | Comparative example |
|---|---|---|---|---|---|---|---|---|---|---|---|
| | | | 21 | 22 | 23 | 24 | 25 | 26 | 27 | 28 | 1 |
| Evaluation | Cleaning performance | Cleaning rate (%) | 88 | 83 | 94 | 76 | 81 | 83 | 85 | 87 | 62 |
| | Degree of hydro-philization | Waterdrop contact angle (°) | 29 | 20 | 18 | 16 | 20 | 11 | 8 | 16 | 14 |

The invention claimed is:

1. A hydrophilizing agent composition comprising (A) an anionic surfactant (hereinafter referred to as component (A)), (B) a nonionic surfactant (hereinafter referred to as component (B)) and water, wherein the composition comprises (A1) an internal olefin sulfonate salt (hereinafter referred to as component (A1)) as the component (A), and (B1) a nonionic surfactant having a hydrocarbon group with 8 or more and 22 or less carbons (hereinafter referred to as component (B1)) as the component (B), wherein the component (B1) is one or more nonionic surfactants selected from the group consisting of (B1-1-2) a nonionic surfactant having a branched hydrocarbon group with 8 or more and 22 or less carbons [hereinafter referred to as component (B1-1-2)], (B1-2) a nonionic surfactant having a linear hydrocarbon group with 11 or more and 22 or less carbons, (B1-3) a nonionic surfactant represented by the following general formula (b4), and (B1-5) a polyoxyalkylene glycerol fatty acid ester, $$R^7—O—[(EO)_{n4}(BO)_{n5}]—R^8 \quad (b4)$$

wherein $R^7$ is a hydrocarbon group with 8 or more and 22 or less carbons; $R^8$ is a hydrogen atom or a methyl group; EO group is an ethyleneoxy group; n4 is an average number of added moles and a number selected from the numbers 3 or more and 30 or less; BO group is a butyleneoxy group; n5 is an average number of added moles and a number selected from the numbers 1 or more and 15 or less; and EO and BO may be a random polymer or a block polymer; and wherein a total content of component (A1) and component (B1) is 2.5 mass % to 20 mass %.

2. The hydrophilizing agent composition according to claim 1, wherein a content of the component (A1) is 0.5 mass % to 10 mass %.

3. The hydrophilizing agent composition according to claim 1, wherein a content of the component (B1) is 2 mass % to 10 mass %.

4. The hydrophilizing agent composition according to claim 1, wherein the composition is for use on hard surfaces.

5. The hydrophilizing agent composition according to claim 1, wherein the composition is for use in cleaning or hydrophilizing.

6. The hydrophilizing agent composition according to claim 1, wherein the internal olefin sulfonate salt has a hydrocarbon chain with 8 or more and 22 or less carbons.

7. The hydrophilizing agent composition according to claim 1, wherein the component (B1) is the component (B1-1-2).

8. The hydrophilizing agent composition according to claim 7, wherein the component (B1-1-2) is a nonionic surfactant represented by the following general formula (b2):

$$R^3—O-(A^2O)_{n2}—R^4 \quad (b2)$$

wherein $R^3$ is a branched hydrocarbon group with 8 or more and 22 or less carbons; $R^4$ is a hydrogen atom or a methyl group; $A^2O$ group is one or more groups selected from alkyleneoxy groups; and n2 is an average number of added moles and a number selected from the numbers 3 or more and 50 or less.

9. A method for hydrophilizing a hard surface comprising contacting a treatment liquid comprising the hydrophilizing agent composition of claim 1 with the hard surface.

10. The method for hydrophilizing a hard surface according to claim 9, wherein a content of the component (A1) in the treatment liquid is 0.001 mass % or more and 1 mass % or less.

11. The method for hydrophilizing a hard surface according to claim 9, wherein a content of the component (B1) in the treatment liquid is 0.001 mass % or more and 0.5 mass % or less.

12. The method for hydrophilizing a hard surface according to claim 9, wherein the internal olefin sulfonate salt has a hydrocarbon chain with 8 or more and 22 or less carbons.

13. The method for hydrophilizing a hard surface according to claim 9, wherein the component (B1) is the component (B1-1-2).

14. The method for hydrophilizing a hard surface according to claim 13, wherein the component (B1-1-2) is a nonionic surfactant represented by the following general formula (b2):

$$R^3—O-(A^2O)_{n2}—R^4 \quad (b2)$$

wherein $R^3$ is a branched hydrocarbon group with 8 or more and 22 or less carbons; $R^4$ is a hydrogen atom or a methyl group; $A^2O$ group is one or more groups selected from alkyleneoxy groups; and n2 is an average number of added moles and a number selected from the numbers 3 or more and 50 or less.

15. The method for hydrophilizing a hard surface according to claim 9, wherein a mass ratio of a content of the component (A1) to a content of the component (B1) in the treatment liquid, (A1)/(B1), is 0.1 or more and 15 or less.

16. The method for hydrophilizing a hard surface according to claim 9, wherein the hard surface is rinsed with water after the treatment liquid is brought into contact with the hard surface.

17. The method for hydrophilizing a hard surface according to claim 9, wherein the method is a cleaning or hydrophilizing method.

* * * * *